(12) United States Patent
Favero et al.

(10) Patent No.: US 10,859,195 B2
(45) Date of Patent: Dec. 8, 2020

(54) SELF LOCKING AND SEALING PIPE TAPPING MEANS

(71) Applicants: Anthony Favero, Mernda (AU); Raymond Rabanin, Sandhurst (AU)

(72) Inventors: Anthony Favero, Mernda (AU); Raymond Rabanin, Sandhurst (AU)

( * ) Notice: Subject to any disclaimer, the term of this patent is extended or adjusted under 35 U.S.C. 154(b) by 417 days.

(21) Appl. No.: 15/535,068

(22) PCT Filed: Dec. 11, 2015

(86) PCT No.: PCT/AU2015/000749
§ 371 (c)(1),
(2) Date: Jun. 12, 2017

(87) PCT Pub. No.: WO2016/090416
PCT Pub. Date: Jun. 16, 2016

(65) Prior Publication Data
US 2017/0363242 A1    Dec. 21, 2017

(30) Foreign Application Priority Data
Dec. 11, 2014    (AU) .................................. 2014905013

(51) Int. Cl.
*F16L 41/06* (2006.01)
*F16L 41/08* (2006.01)
(Continued)

(52) U.S. Cl.
CPC ........... *F16L 41/088* (2013.01); *F16L 19/005* (2013.01); *F16L 19/0286* (2013.01);
(Continued)

(58) Field of Classification Search
CPC ......... F16L 41/04; F16L 41/06; F16L 41/065; F16L 41/12; F16L 41/14
See application file for complete search history.

(56) References Cited

U.S. PATENT DOCUMENTS 522,005 A * 6/1894 Burke ..................... F16L 41/14
                                                                    285/210
524,051 A * 8/1894 Walker .................... F16L 41/14
                                                                    285/210
(Continued)

FOREIGN PATENT DOCUMENTS

DE         645434 C  *  5/1937  .............. F16L 41/04
DE         841089 C  *  6/1952  .............. F16L 41/04
(Continued)

*Primary Examiner* — David Bochna
(74) *Attorney, Agent, or Firm* — Galbreath Law Offices, P.C.; John A. Galbreath

(57) ABSTRACT

The invention is a tapping assembly for use on a pipe or tank. It includes a hollow body that sits flush on the outer wall of the pipe or tank and includes a plurality of locking members that sit flush within the body and form a threaded portion into which a cap is insertable. Each locking member extends into the interior of the pipe or tank, and has an outwardly extending flanged portion that engages with the inner sidewall of the pipe or tank. When the cap is tightened against the body, it causes each of the locking member to retract, thereby causing the respective flange portions to lock the assembly against the pipe or tank wall. The assembly can be manufactured to provide either an orthogonal tap, or an angled tap, relative to the longitudinal axis of the pipe, or plane of the tank sidewall.

14 Claims, 6 Drawing Sheets

(51) Int. Cl.
*F16L 37/091* (2006.01)
*F16L 19/00* (2006.01)
*F16L 19/028* (2006.01)
*F16L 37/00* (2006.01)
*F16L 41/14* (2006.01)
*F16L 15/02* (2006.01)
*F16L 23/18* (2006.01)
*F16L 47/30* (2006.01)

(52) U.S. Cl.
CPC ......... *F16L 37/008* (2013.01); *F16L 37/0915* (2016.05); *F16L 41/06* (2013.01); *F16L 41/08* (2013.01); *F16L 41/14* (2013.01); *F16L 15/02* (2013.01); *F16L 23/18* (2013.01); *F16L 47/30* (2013.01)

(56) References Cited

U.S. PATENT DOCUMENTS

| | | | | |
|---|---|---|---|---|
| 526,285 A * | 9/1894 | Ayling | F16L 41/14 | 285/210 |
| 567,115 A * | 9/1896 | Atkinson et al. | F16L 41/14 | 285/210 |
| 594,526 A * | 11/1897 | Glauber | F16L 41/14 | 285/210 |
| 621,108 A * | 3/1899 | Leonard | F16L 41/14 | 285/210 |
| 757,641 A * | 4/1904 | Saunders | F16L 41/14 | 285/210 |
| 832,287 A * | 10/1906 | Beach | F16L 41/14 | 285/210 |
| 833,239 A * | 10/1906 | Plunkett | F16L 41/14 | 285/210 |
| 945,517 A * | 1/1910 | Goodwin | F16L 41/14 | 285/210 |
| 1,043,230 A * | 11/1912 | Henderson | F16L 41/14 | 285/210 |
| 1,765,753 A * | 6/1930 | Bremer | F16L 41/14 | 285/210 |
| 2,537,183 A * | 1/1951 | Bloomer | F16L 41/14 | 285/210 |
| 4,422,676 A * | 12/1983 | Sitabkhan | F16L 39/04 | 285/121.4 |
| 5,560,388 A * | 10/1996 | Caldwell | F16L 41/06 | 137/15.15 |
| 5,577,776 A * | 11/1996 | Welch | F16L 41/06 | 285/197 |
| 5,957,505 A | 9/1999 | Jarvenkyla | | |
| 2002/0189674 A1 * | 12/2002 | Meeder | F16L 41/14 | 137/359 |
| 2004/0135367 A1 * | 7/2004 | Otsuga | F16L 41/14 | 285/133.11 |

FOREIGN PATENT DOCUMENTS

| | | | |
|---|---|---|---|
| EP | 0793048 A1 * | 9/1997 | ............. F16L 41/12 |
| JP | H06109189 | 4/1994 | |
| WO | WO 2014/085867 | 6/2014 | |

* cited by examiner

SELF LOCKING AND SEALING PIPE TAPPING MEANS

FIELD OF THE INVENTION

This invention relates to tapping means for pipes and tanks, and is suitable for use on pipes and tanks that may contain pressurised contents.

BACKGROUND OF THE INVENTION

The need to tap pipes and tanks in fluid transfer systems is common. As fluid transfer needs often change over time, so too is there a need to change the fluid transfer system. Quite often a new branch pipe is required to tee off of a main pipe. In other scenarios, it may become necessary to create a new tap into a tank.

The Tapping of pipes is common, and often involves the use of a tapping band that surrounds the pipe being tapped, to provide a solid foundation onto which the branching pipe, or other apparatus, can be securely fastened to the pipe. A major problem associated with this is that many pipes may need to be worked on in-situ. Quite often this means that access to the entire periphery of the pipe to apply the tapping band is difficult, cramped, and more time consuming, because sufficient space around the periphery of the pipe, particularly if it is a buried pipe, needs to be cleared away.

Another problem, again mainly associated with buried pipes, particularly water pipes and other pipes containing types of liquids, is that the area around the portion of the pipe being worked on can become muddy. Often the devices required to produce a secure tap of the pipe include many small parts, including bolts, that can easily be dropped while working on the pipe. Often these objects can be lost in the mud at the bottom of the pipe trench.

It is an object of the present invention to produce a tapping means that at least mitigates some of these problems.

DISCLOSURE OF THE INVENTION

The invention provides in one aspect, a tapping assembly for use on a pipe or a tank including a body, at least two locking members, and a cap. The body has a hollow circular cross-section with a base portion at one end, and a cap receiving portion at the opposite end. The base portion is contoured to match the contour of the surface of the pipe or tank against which the tapping assembly is attached, so that the base can sit flush against the external surface of the pipe or tank. The at least two locking members are pivotally attached to, and located at, diametrically opposed locations on the inner wall of the base. Each locking member is capable of independent movement, and each locking member, extends beyond the contoured shape of the base portion, into the interior of the pipe or tanks. Each locking member has an arcuate profile, and an inner face that is threaded, and an outer face that includes a flanged portion at the end that extends below the base portion. The inner faces of the least two locking members combine to provide a circular threaded opening. The cap has an inner portion, a flange, and an outer portion, and the inner portion extends outwardly from the flange portion, and has a circular cross-section with a matching diameter and an external thread that matches the threaded opening, so that in use, a hole is formed in the wall of the pipe or tank, and the body is then placed over the hole and each locking member is manipulated so that its respective flanged portion is internal to the pipe or tank. Then the cap is inserted into the circular threaded opening, and the inner portion ensures each locking member is constrained against the inner wall of the body so that each respective flanged portion remains fully outwardly extended.

In another aspect of the invention, the base portion of the body is appropriately angled, with respect to the longitudinal axis of the pipe, or the plane of a sidewall of the tank, and contoured so that it sits flush against the external surface of the pipe or tanks, to thereby create an angled tap, and wherein the locking members have various lengths that match the angle of the tap, so that the flanged portion of each locking member extends an appropriate distance into the interior of the pipe or tank.

Preferably the inner wall of the body has at least two diametrically opposed slots and each slot contains one locking member, and each slot enables its locking member to slide so that each locking member is adapted to independently retract a short distance in a longitudinal direction with respect to the body. The slot is sufficiently deep to allow the inner surface of the respective locking member contained within it to sit flush with the inner wall of the body, with only the threaded portion of each locking member extending inwardly with respect to the interior of the body.

As the cap is screwed into the at least two locking members, so that eventually the cap against the upper end of the body, and any continued turning of the cap causes each locking member to slide towards the cap within its respective slot, so that each flange portion is tightened against the inner wall of the pipe or tank, thereby locking the tapping assembly in place.

Preferably each flanged portion on its respective locking member has a contoured inner face that matches the contour of the inner surface of the pipe or tank to which the tapping assembly is applied.

Preferably each slot includes means to releasably retain each respective locking member at its lowermost position prior to the cap being inserted, so that any further turning of the cap after the flange makes contact with the body, forces each locking member to slide and retract, within its respective slot.

Preferably four locking members are used, and the locking members are equi-spaced around the internal periphery of the body.

Preferably the body includes sealing means on the cap receiving face and the face of the base portion.

Preferably each sealing means is a suitable O-ring.

Preferably the outer portion of the cap can be blind, or include connection means to other objects, such as another pipe or a valve by way of example only.

Optionally, a stiffening insert is included. The stiffening insert has a hollow circular cross-section with an outer diameter that closely matches the inner diameter of the body and its associated locking members, and having a contoured oval shaped profile at the end closest to the interior of the pipe or tank, that closely matches the substantially contoured oval shaped profile formed at the flanged ends of each of the at least two locking members, and a circular profile at the opposite end. The stiffening insert includes an externally extending protrusion that abuts against a suitably located shoulder within the body to prevent the stiffening insert from sliding too far into the body.

Preferably the protrusion is in the form of a spine that extends a short distance down the external side wall of the stiffening insert, and the body has a corresponding slot, located on its inner wall, in a space between a pair of locking members, so that the spine and corresponding slot interengage to firstly orientate the position of the stiffening insert with respect to the body, and to ensure that the stiffening insert can only be inserted into the body a set distance before the base of the spine abuts against the base of the corresponding slot, thereby preventing the insert from sliding too far into the pipe or tank to which the tapping assembly is attached.

Preferably the insert is sufficiently stiff to reinforce each of the locking members and prevent them from deforming inwardly when the tapping assembly is tightened in place on the pipe or tank.

A method of attaching a tapping assembly to a pipe or tank will now be described. The tapping assembly includes a hollow circular body having a plurality slots around its internal wall, and a plurality of locking members slidably attached to, and contained within, a respective slot, and each locking member has a flanged portion at its lowermost end, and an arcuate shaped internal profile, so that when they are contained in their respective slots, they sit flush with the interior of the internal wall of the body. Each locking member includes an internally projecting threaded portion in the upper region of the locking member, so that when in place, the plurality of locking members combine to form a circular threaded portion. Sealing means, and a cap that is capable of screwing into the circular threaded portion are also included. The said method including the following steps:
  a) preparing a hole in a preferred location in the sidewall of a pipe or tank that has a matching diameter to the combined diameter of the plurality of locking members when they are constrained fully against the inner wall of the body; and
  b) ensuring each locking member is releasably held in its lowermost position with respect to its slot; and
  c) manipulating the body over the hole prepared in step a) so that the flanged portion of each locking member is located internally to the pipe or tank; and
  d) inserting the cap into the internally threaded circular opening formed by the locking members; and
  e) turning the cap so that when the cap abuts against the body, any continued turning of the cap causes each insert to retract upwardly towards the cap, thereby drawing each respective flanged portion of the locking member up against the inner wall of the pipe or tank; and
  f) tightening the cap within the assembly so that the flanged portions of the locking members retract tightly against the inner wall of the pipe or tank so as to ensure the sealing means between the body and the out pipe or tank wall, and the sealing means between the flange of the cap and the body, is fully engaged, and the assembly is held securely in place.

Preferred aspects of the invention will now be described with reference to the accompanying drawings.

DETAILED DESCRIPTION OF THE PREFERRED EMBODIMENTS

Figure 1:
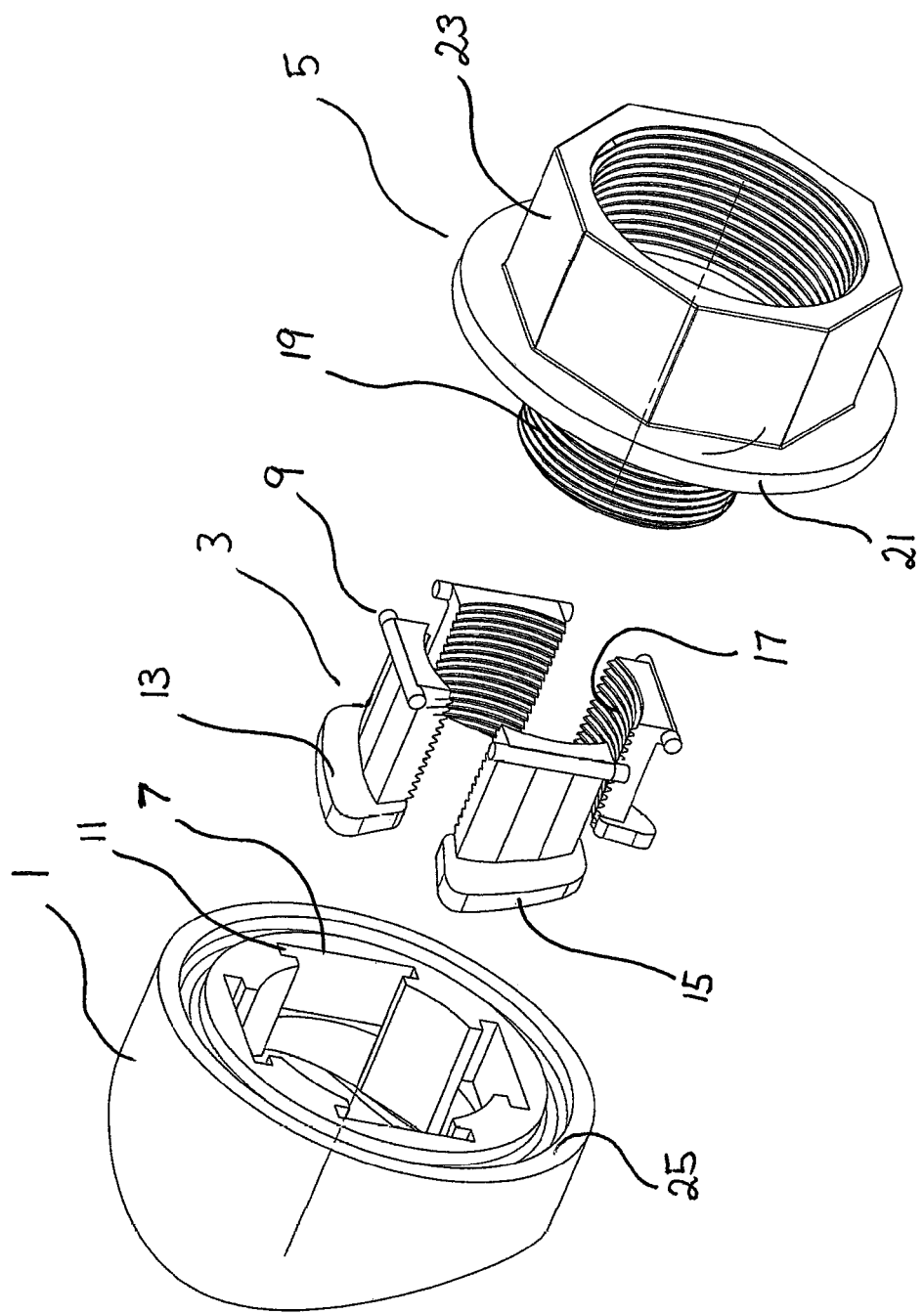
FIG. 1 is an exploded isometric view of the assembly in accordance with the present invention.

Turning firstly to FIG. 1, we see the three main components of the invention. Firstly there is the hollow body 1. In this preferred embodiment four equi-spaced locking members 3 are housed within the hollow body 1. When the four locking members are in place, they combine to form a circular threaded opening 33 (See FIG. 3) into which the cap 5 can be screwed.

The body 1 has a plurality of slots 7, and each slot 7 is capable of housing one locking member 3.

Each locking member 3 has a pair of extensions 9, and these extensions fit within recesses 11 within each slot 7. Once the extensions 9 of each locking member 3 is located inside the recesses 11 of each slot 7, then the locking member 3 is free to pivot inwardly with respect to the hollow body 1. It also allows each locking member 3 to be slidable along a short distance along the longitudinal direction of the body 3. Each locking member 3 also has a flanged portion 13 that extends laterally outwardly to the locking member 3. Each locking member 3 is sufficiently long enough to ensure that the flanged portion upper face 13 initially sits behind the sidewall of the pipe. As previously mentioned, when the four locking members 3 are in place, they combine to form a circular threaded opening 33. Each locking member 3 has a threaded inner face 17, and an arcuate profile, and each arcuate profile provides a portion of the circular threaded opening 33.

The cap 5 has an externally threaded inner portion 19, a flange 21 and an outer portion 23. The threaded inner portion 19 is dimensioned to the match the dimensions of the threaded hole created by the plurality of locking members 3. The thread on the inner portion 19 matches the thread used on the threaded inner face 17 of the locking members 3. Once the cap 5 is engaged with each locking member 3, each locking member 3 is no longer able to pivot, but is instead constrained against the inner periphery of the body 1. This holds each of the flanged portions 15 at their maximum outward position, so that the flanged portion upper face 13 is able to eventually engage with the inner wall of the pipe of tank onto which the apparatus is being secured.

As the cap 5 is turned into the opening 33 formed by the locking members 3, eventually the flange 21 makes flush contact with the top end face 25 of the body 3. Continued turning of the cap 5 then forces each locking member to ride upwardly along the thread. This causes each flanged portion 15 to be drawn upwardly until it eventually makes contact with the inner wall of the pipe or tank onto which the assembly is being attached. When the cap 5 is fully tightened, each flanged portion 15 provides a clamping action against the inner face of the pipe wall.

A bottom seal 27 (see FIG. 3) sits on the bottom face of the body, and seals the body 5 against the outer wall of the pipe or tank. A top seal 29 (see FIG. 4) sits in the top end face 25 and seals the body against the cap flange 21.

Figure 2:
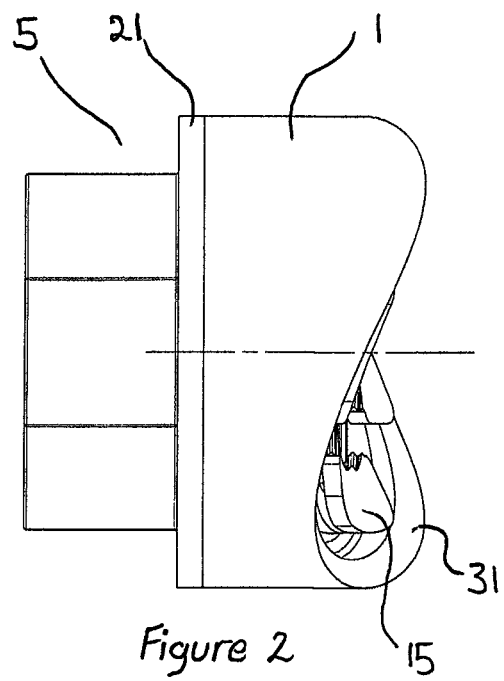
FIG. 2 is a side elevation of the assembly, with the base of the body contoured to match the sidewall contour of a pipe.

Turning to FIG. 2 we can see the bottom face 31 of the body has a contoured shape that is selected, or fabricated, to match the contour of the external wall of the pipe or tank to which the apparatus is securely attached. In the case of attachment to a pipe wall, the flanged portions 15 of each locking member 3 is also contoured to match the shape of the inner pipe wall against which the flange will clamp when the cap 5 is tightened.

Figure 3:
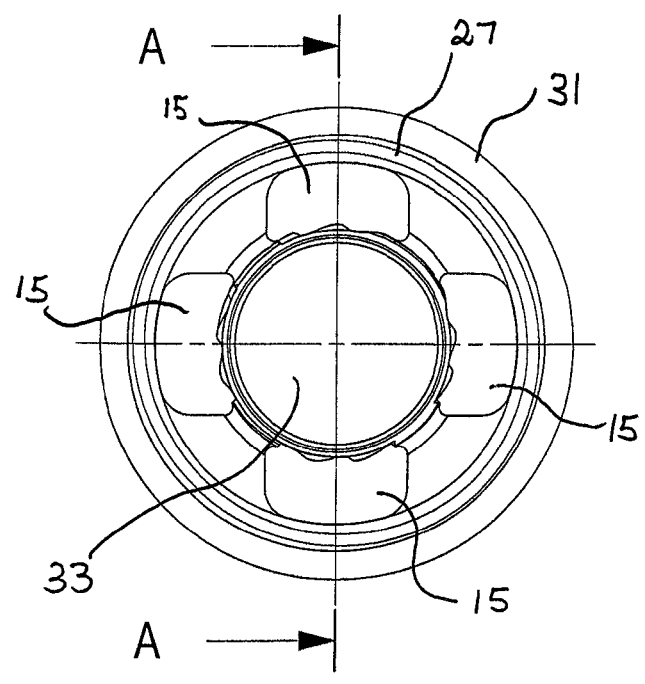
FIG. 3 is an end view looking up from the bottom of the base.

In FIG. 3 we see an end view looking up from the bottom face 31 of the body 1. In this view we can see the bottom seal 27.

Figure 4:
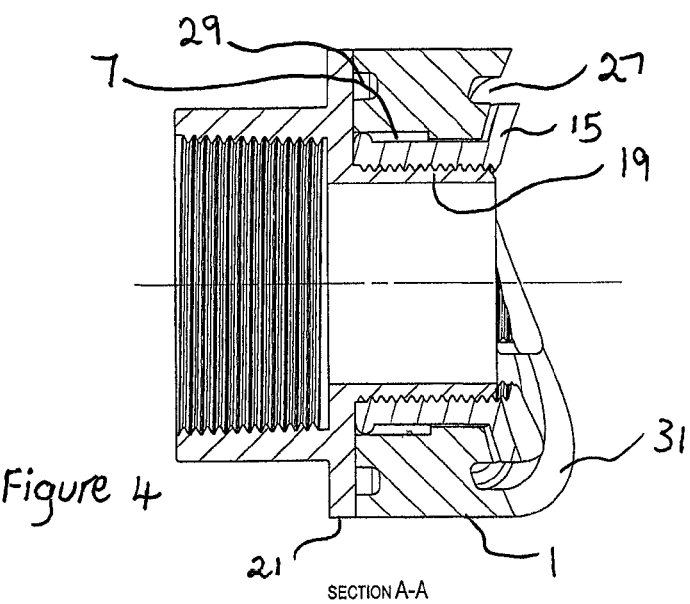
FIG. 4 is a side elevation sectional view of the present invention with the section taken through line A-A of FIG. 3.

In the sectional view of FIG. 4 taken through line A-A of FIG. 3 we can see how each locking member 3 can slide along a respective slot 7. As the cap 5 is turned after the flange 21 makes contact with the top end face 25 of the body 1, each locking member 3 is forced to retract upwardly under the influence of the threaded inner face 17 on each locking member 3, thereby creating a clamping action between the flanged portions 15 of the locking members 3 against the inner wall of the pipe or tank to which the apparatus is securely attached.

Figure 5:
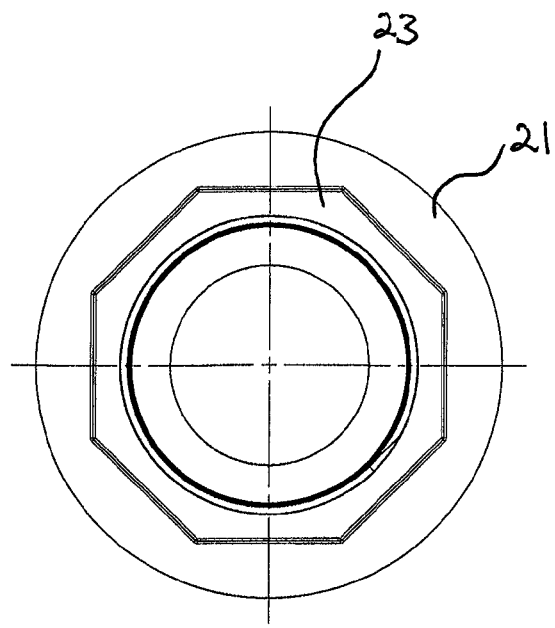
FIG. 5 is an end view of the assembly, looking down upon the top of the cap.

In FIG. 5 we are shown a top view of the apparatus. In this embodiment, a simple internally threaded pipe stub is formed in the cap outer portion 23. In this embodiment the upper extension 23 has a hexagonal profile to allow for a tool such as a wrench to be used to tighten the assembly. Many other types of cap could be used, including a blank to close the opening.

Figure 6:
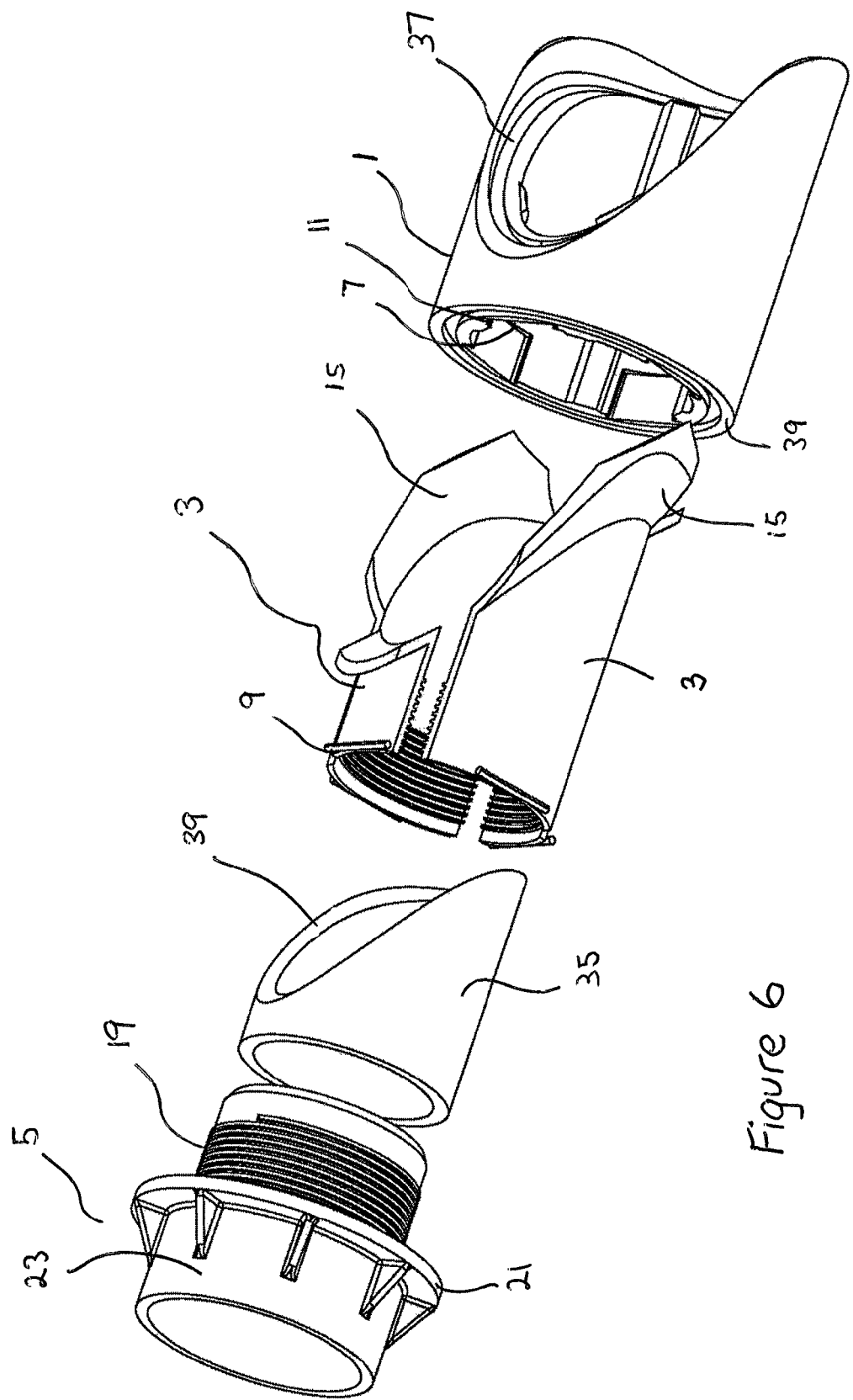
FIG. 6 is an exploded view of a second embodiment of the invention where the tap created by the tapping assembly forms an angle with respect to the longitudinal axis of the pipe, or the plane of the side wall of a tank.

Turning to FIG. 6, we are shown an exploded view of an alternate embodiment of the present invention. Many of the features are the same as the previous embodiment, however this form of the invention enables an angled tap to be created, relative to the longitudinal axis of the pipe, or the plane of the side wall of the tank, to which the tapping assembly is attached. The example shown in FIG. 6 is for use with tapping a circular pipe at an angle. In order for the hollow body 1 to sit flush against the outer wall of the pipe at an angle, a contoured substantially oval shape 37 is formed at the end of the hollow body 1 that abuts the outer wall of the pipe. In this example, four locking member 3 are included in the assembly. Each has an appropriate length to enable the flanged portion 15 on each respective locking member 3 to extend sufficiently into the interior of the pipe. Each locking member 3 includes a pair of extensions 9, and the hollow body 1 includes a respective slot 7 that is adapted to accommodate one insert 3. The pair of extensions 9 on each locking member retains the respective locking member 3 within its slot 7. This allows each locking member to be able to independently pivot inwardly, with respect to the hollow body 1, and to slide within the slot at the assembly is tightened, thereby retracting the flanges 15 against the inner wall of the pipe.

In the simplest form of this embodiment, the stiffening insert 35 is not required, and the action of the cap 5 as it is screwed into the respective threaded portion of the locking members, is sufficient to force the locking members 3 hard against its respective slot, and to force the locking member to retract once the circular flange 21 abuts against the circular end 39 of the hollow body 1.

In circumstances where some of the locking members 3 are very long, a problem may occur where at least some of the locking members 3, particularly the longest ones, flex and deform out of shape as the assembly is tightened. This may cause at least some of the flanges 15 to disengage with the pipe's inner wall, and may therefore degrade the integrity of the tapping assembly, and cause undesirable leaks or sudden failure, particularly in a high pressure application. To prevent this, an optional stiffening insert 35 is included. The stiffening insert 35 has a substantially similar contoured oval shaped opening 39 at the end nearest to the pipe or tank to the contoured oval shape 37 in the hollow body 1. The insert 35 is dimensioned to slide snuggly against the innermost face of each respective locking member 3.

Figure 7:
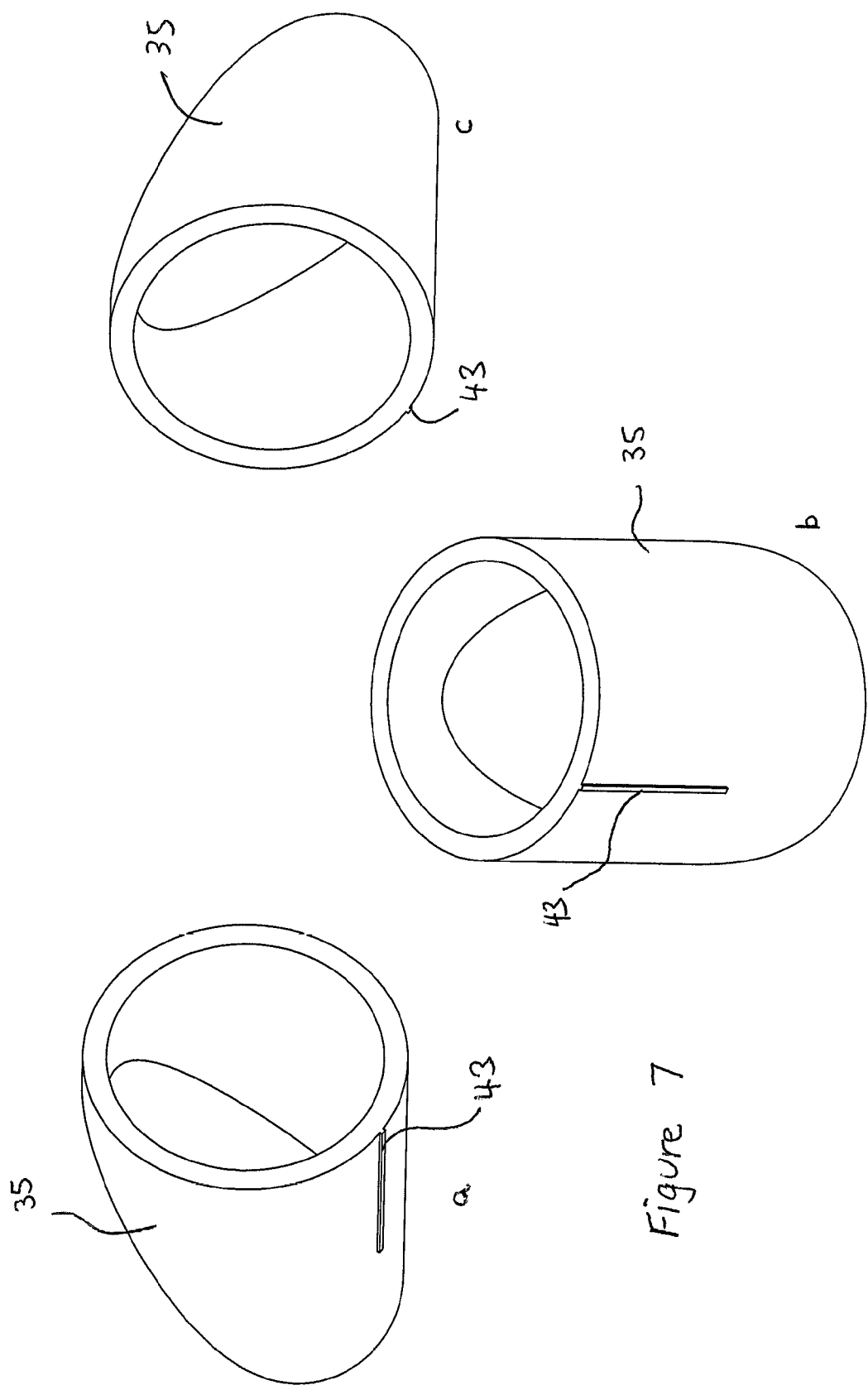
FIGS. 7*a*, *b* and *c* show a variety of isometric views of the stiffening sleeve used in one form of the present invention.

As shown in FIGS. 7a, b and c, to help orientate the stiffening insert 35 and to prevent the stiffening insert from sliding too far into the body, a short vertical spine 43 is included on the outer wall of the stiffening insert.

Figure 8:
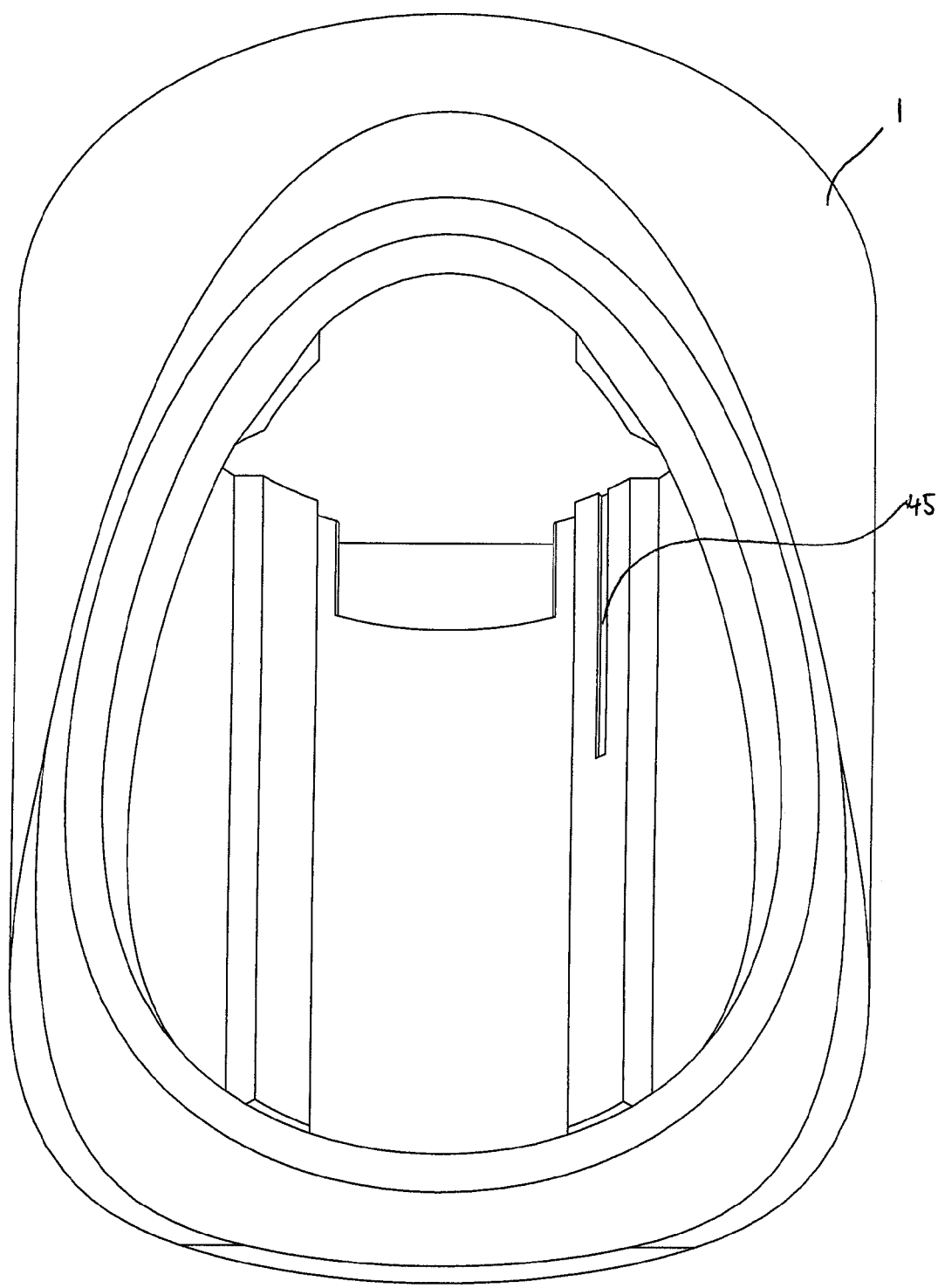
FIG. 8 shows an isometric view of the body used in one form of the present invention.

As seen in FIG. 8, the body 1 has a corresponding slot 45 that interengages with the spine 43. When the lowermost end of the spine 43 abuts against the bottom of the slot 45, the stiffening insert 35 can slide no further into the body 1.

The minimum number of locking members that can be used in either variant of the invention is two, however four are preferred, as these produce a more even clamping force that is more efficient at ensuring that the bottom seal is properly seated against the outer wall of the pipe or tank.

While the above description includes the preferred embodiments of the invention, it is to be understood that many variations, alterations, modifications and/or additions may be introduced into the constructions and arrangements of parts previously described without departing from the essential features or the spirit or ambit of the invention.

It will be also understood that where the word "comprise", and variations such as "comprises" and "comprising", are used in this specification, unless the context requires otherwise such use is intended to imply the inclusion of a stated feature or features but is not to be taken as excluding the presence of other feature or features.

The reference to any prior art in this specification is not, and should not be taken as, an acknowledgment or any form of suggestion that such prior art forms part of the common general knowledge.

The invention claimed is:

1. A tapping assembly for use on a pipe or a tank including:
   a body, and
   at least two locking members, and
   a cap,
   wherein the body has a hollow circular cross-section with a base portion at one end and a cap receiving portion at the opposite end, and wherein the base portion is contoured to match the contour of the surface of the pipe or tank against which the tapping assembly is attached, so that the base can sit flush against the external surface of the pipe or tank, and wherein no internal walls of the body has a threaded face, and wherein the at least two locking members are pivotally attached to and retained by respective attachment means and located at diametrically opposed locations on the inner wall of the base, and each locking member is capable of independent movement, and each locking member extends beyond the contoured shape of the base portion into the interior of the pipe or tank, and wherein each locking member has an arcuate profile, and an inner face that is threaded, and an outer face that includes a flanged portion at the end that extends below the base portion, and where the inner faces of the least two locking members combine to provide a circular threaded opening, and wherein the cap has an inner portion, a flange, and an outer portion, and the inner portion extends outwardly from the flange portion and has a circular cross-section with a matching diameter and an external thread that matches the threaded opening, so that in use, a hole is pre-formed in the wall of the pipe or tank, and the body is then placed over the hole, and each locking member is manipulated so that its respective flanged portion is internal to the pipe or tank, and then the cap is inserted into the circular threaded opening, and the inner portion ensures each locking member is constrained against the inner wall of the body, so that each respective flanged portion remains fully outwardly extended.

2. The tapping assembly as defined in claim 1 wherein the base portion of the body is appropriately angled, with respect to the longitudinal axis of the pipe, or the plane of a sidewall of the tank, and contoured so that it sits flush against the external surface of the pipe or tanks, to thereby create an angled tap, and wherein the locking members have different lengths with respect to one another that each match the angle of the tap, so that the flanged portion of each locking member extends an appropriate distance into the interior of the pipe or tank.

3. The tapping assembly as defined in claim 2 wherein a stiffening insert is included, said stiffening insert having a hollow circular cross-section with an outer diameter that closely matches the inner diameter of the body and its associated locking members, and having a contoured oval shaped profile at the end closest to the interior of the pipe or tank, that closely matches the substantially contoured oval shaped profile formed at the flanged ends of each of the at least two locking members, and a circular profile at the opposite end, and wherein the stiffening insert includes an externally extending protrusion that abuts against a suitably located shoulder within the body to prevent the stiffening insert from sliding too far into the body.

4. The tapping assembly as defined in claim 3 wherein the protrusion is in the form of a spine that extends a short distance down the external side wall of the stiffening insert, and the body has a corresponding slot, located on its inner wall, in a space between a pair of locking members, so that the spine and corresponding slot interengage to firstly orientate the position of the stiffening insert with respect to the body, and to ensure that the stiffening insert can only be inserted into the body a set distance before the base of the spine abuts against the base of the corresponding slot, thereby preventing the insert from sliding too far into the pipe or tank to which the tapping assembly is attached.

5. The tapping assembly as defined in claim 3 wherein the insert is sufficiently stiff to reinforce each of the locking members and prevent them from deforming inwardly when the tapping assembly is tightened in place on the pipe or tank.

6. The tapping assembly as claimed in claim 1 wherein the inner wall of the body has at least two diametrically opposed slots, and wherein each slot contains one locking member, and each slot enables its locking member to slide so that each locking member is adapted to independently retract a short distance in a longitudinal direction with respect to the body, and wherein the slot is sufficiently deep to allow the inner surface of the respective locking member contained within it to sit flush with the inner wall of the body.

7. The tapping assembly as claimed in claim 6 wherein as the cap is screwed into the at least two locking members, so that eventually the cap abuts against the upper end of the body, and any continued turning of the cap causes each locking member to slide towards the cap within its respective slot, so that each flanged portion is tightened against the inner wall of the pipe or tank, thereby locking the tapping assembly in place.

8. The tapping assembly as claimed in claim 6 wherein each flanged portion on its respective locking member has a contoured inner face that matches the contour of the inner surface of the pipe or tank to which the tapping assembly is applied.

9. The tapping assembly as claimed in claim 6 wherein each slot includes means to releasably retain each respective locking member at its lowermost position prior to the cap being inserted, so that any further turning of the cap after the flange makes contact with the body, forces each locking member to slide and retract, within its respective slot.

10. The tapping assembly as claimed in claim 6 wherein four locking members are used, and the locking members are equi-spaced round the internal periphery of the body.

11. The tapping assembly as claimed in claim 6 wherein the body includes sealing means on the cap receiving face and the face of the base portion.

12. The tapping assembly as claimed in claim 11 wherein each sealing means is a suitable O-ring.

13. The tapping assembly as defined in claim 6 wherein the outer portion of the cap can be blind, or include connection means to other objects, such as another pipe or a valve for example.

14. A method of attaching a tapping assembly to a pipe or tank, the tapping assembly including:
  a hollow circular body having a plurality slots around its internal wall, and a plurality of locking members slidably attached to, and contained within, a respective slot, so that each locking member is adapted to slide within its respective slot, and each said locking member having a flanged portion at its lowermost end, and an arcuate shaped internal profile, so that when they are contained in their respective slots, they sit flush with the interior of the internal wall of the body, and each locking member includes an internally projecting threaded portion in the upper region of the locking member, so that when in place, the plurality of locking members combine to form a plurality of arcuate shaped threaded portions which combine to form a segmented circular threaded portion;
  sealing means;
  and a cap that is capable of screwing into the segmented circular threaded portion, the said method including the following steps;
  a) preparing a hole in a preferred location in the sidewall of a pipe or tank that has a matching diameter to the combined diameter of the plurality of locking members when they are constrained fully against the inner wall of the body; and
  b) ensuring each locking member is releasably held in its lowermost position with respect to its respective slot; and
  c) manipulating the body over the hole prepared in step a) so that the flanged portion of each locking member is located internally to the pipe or tank; and
  d) inserting the cap into the internally threaded circular portion formed by the locking members; and
  e) turning the cap so that when the cap abuts against the body, any continued turning of the cap causes each insert to retract upwardly towards the cap within its respective slot, thereby drawing each respective flanged portion of the locking member up against the inner wall of the pipe or tank; and
  f) tightening the cap within the assembly so that the flanged portions of the locking members retract tightly against the inner wall of the pipe or tank so as to ensure the sealing means located between the body and the out pipe or tank wall, and the sealing means between the flange of the cap and the body, is fully engaged, and the assembly is held securely in place.

* * * * *